Feb. 29, 1944.    S. B. GRISCOM    2,342,800
GENERATOR GROUNDING SYSTEM
Filed May 8, 1942
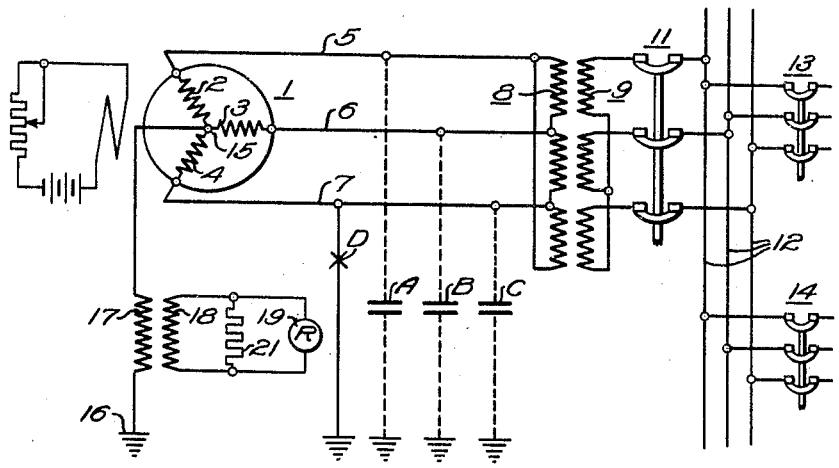
WITNESSES:
Robert C. Baird
Nw. C. Groome
INVENTOR
Samuel B. Griscom.
BY
Franklin E. Hardy
ATTORNEY Patented Feb. 29, 1944

2,342,800

UNITED STATES PATENT OFFICE 2,342,800

GENERATOR GROUNDING SYSTEM

Samuel B. Griscom, Wilkinsburg, Pa., assignor to Westinghouse Electric & Manufacturing Company, East Pittsburgh, Pa., a corporation of Pennsylvania Application May 8, 1942, Serial No. 442,174

6 Claims. (Cl. 175—294)

My invention relates to generator grounding systems employed as a means for protecting the generator from faults to ground which may occur either in the generator windings or in the circuits immediately connected thereto.

It will be appreciated that the generator phase windings are connected in star relation with respect to each other and connected to transformers which step up the generated voltage to the transmission line value. The generator circuit includes the phase windings of the generator, the low voltage windings of the transformer and the cable connection including the conductors connected between the generator and the transformer.

It is undesirable to directly ground the neutral point of generator phase windings because ground fault currents may exceed the three-phase fault current and thus cause a mechanical strain on the generator windings which will result in distortion of the windings. It is desirable, therefore, to ground the generator neutral point through an impedance that is at least sufficient to limit the ground fault current to the three-phase value in order to provide against the windings being mechanically distorted to an extent requiring replacement.

Where the neutral points of generator phase windings are grounded and no further limitation of ground current is required other than that the ground current be so limited as to prevent a distortion of the generator windings, a neutral reactor or resistor connected between the neutral point of the winding and ground is suitable. Several forms of ground fault detectors have been used in the past, such for example as connecting a primary winding of a transformer between the generator neutral point and ground and connecting the secondary winding of the transformer to a relay or alarm device which will operate upon the voltage arising from the neutral displacement of voltage from ground potential as a result of a ground fault in the generator windings or circuit conductors immediately connected thereto. Another form of ground fault detector is the provision of three potential transformers having their primary windings connected in star relation between the generator terminals and ground and their secondary windings connected in delta and including the winding of the relay for giving the alarm or operating sectionalizing circuit breakers in a well known manner.

Another form of detector provides three potential transformers with the primary winding connected in star as before and an additional resistor or reactor between the star or neutral point of the primary windings and ground with the secondary windings connected in delta relation as in the last previous example, the delta connection including also the winding of the sectionalizing or alarm relay.

In all of these types of ground fault detectors, there is danger of false indication which may be caused by ground faults on the high voltage transmission line system. In generator stations part of the zero sequence voltage on the high voltage side of the transformer created by a line-to-ground fault in the transmission line is transferred to the low voltage or generator side of the step up transformer by capacity potentiometer effect and will give some voltage across the ground fault detecting relay above referred to. The magnitude of this voltage is determined by the ratio of transformation, the type of high voltage grounding employed, the proximity of the fault to the generating station, the amount of capacitances in the transformer branches and the generator and the burden of the relay. In general, the larger the transformer bank and the higher the voltage, the greater the risk of false operation.

There is also danger of false indication which may be caused by ferro-resonance effect which results when a transformer saturates at the higher of its two theoretically possible values caused by a transient current which may exist for a short time only. When the ferro-resonance effect occurs, the current flow continues at the higher of the two current values which may be greatly in excess of the lower value and be very undesirable. Overvoltages dangerous to insulation may also result from this effect.

False indications may also be caused by high transient overvoltages in the case of arcing faults in the generator circuit or switching operations in the transmission line, and also due to the presence of harmonics present in the circuit.

I have found that the difficulties with prior ground fault detectors may be eliminated by the provision of a circuit which consists of connecting the primary of a distribution type transformer between the generator neutral point and ground. The secondary of this transformer is shunted by a resistor and by a potential relay for tripping a sectionalizing circuit breaker or an alarm device, as desired. The size of the transformer and the resistor connected to its secondary is dependent upon the charging current that will flow from the generator circuit to ground in case of a line-to-ground fault. The value of this charging current will depend upon the capacitance to ground of the generator, generator lead, and transformer low voltage winding connected to the generator.

I have also found that if the transformer kilovolt-ampere capacity is made about equal to the capacitive kilovolt amperes that will flow upon the grounding of one terminal or generator conductor with full generator voltage applied to the generator circuit, and if the resistor in shunt to the secondary circuit of the neutral grounding transformer is so proportioned that the kilowatts dissipated in the circuit between the generator neutral and ground is about equal to the capacitive fault kilovolt amperes, a satisfactory circuit results. This proportioning of the circuit will avoid the so-called ferro-resonance effect which sometimes results when an unshunted transformer saturates at the higher of its two theoretically possible values. This proportioning of the resistance value will also prevent high transient overvoltages in case of arcing faults or switching operations in the transmission line and will swamp any harmonics present in the potential indication, making it possible to use lower settings for the ground relay without danger of false operation.

The kilovolt-ampere capacity of the neutral grounding transformer and the resistance value of the resistor connected in shunt to the secondary circuit of the neutral grounding transformer may vary somewhat from these preferable values. The purpose sought to be accomplished is to limit or prevent a false indication of a ground fault and to avoid dangerous overvoltages which might be caused by one of a number of circumstances, such as (1) by zero-sequence capacitive coupling between the high-voltage and low-voltage circuits through the capacity effect of the power-transformer windings which step up the generated voltage to the transmission line voltage value, (2) by transient overvoltages caused by arcing ground or switching operations in the system, or (3) from the presence of harmonics. With disturbances in the relay circuit from these causes eliminated, it is possible to increase the sensitivity of the setting of the relay.

In order to bring this about, the most desirable value of kilovolt-ampere capacity of the neutral grounding transformer and the resistance value of the resistor connected in shunt to the secondary will vary in particular cases, depending upon which one of the above-named three factors is most dominant in a particular installation. The value of the kilovolt-ampere capacity of the neutral grounding transformer should preferably be about equal to the kilovolt-ampere capacity of the charging current to ground from the ungrounded conductors of the generator, and its variation from this value should be not greater than from one-fifth of this value to five times this value.

Likewise, the value of the resistance across the secondary winding of the transformer should preferably be such that the energy dissipated in the circuit connection between the generator neutral and ground corresponds to the kilovolt-amperes of the charging current to ground that will flow from the ungrounded conductors of the generator circuit upon the grounding of one of the conductors of the generator circuit with full line-to-ground voltage on the circuit, and any variation from this value should not be greater than from one-fifth of this value to five times this value.

It is, therefore, an object of the invention to provide a grounding system for generators which avoids the above-indicated objections of prior systems and provides a grounded neutral system for the generator that is not subject to false indications due to faults in the high-voltage transmission line system through a capacity coupling between the high voltage system and the local generator circuit on the generator side of the step-up transformers.

More specifically, the invention provides for connecting the primary winding of a transformer between the generator neutral point and ground and the provision of a resistor connected across the transformer secondary winding, the resistor being proportioned with respect to the charging current to ground that will flow in the case of a fault between the generator circuit and ground.

Referring to the drawing, in which the single figure represents a diagrammatic view of circuits and apparatus arranged in accordance with the invention, a generator 1 is provided having three phase windings 2, 3 and 4 connected to terminal conductors 5, 6 and 7 that are connected to the delta connected windings 8 of a step-up transformer, the primary windings 9 of which are connected through a circuit breaker 11 through buses 12 from which the transmission line circuits are connected through circuit breakers 13 and 14. The neutral point 15 of the generator phase windings 2, 3 and 4 is connected to ground at 16 through a circuit including the primary winding 17 of a distribution type transformer having an insulation level corresponding to that of the phase windings of the generator so as to withstand full neutral-to-line voltage between the neutral generator and ground.

The secondary winding 18 of the distribution transformer is connected to a relay 19 which may serve as means for giving an alarm or as means for initiating operation of the circuit breaker 11 in a well known manner. A resistor 21 is provided connected across the transformer secondary winding 18.

In accordance with the invention, the kilovolt-ampere capacity of the transformer having windings 17 and 18 is about equal to the zero sequence capacitive fault kilovolt-amperes that will flow between the generator circuit and ground upon the grounding of one phase circuit conductor or winding of the generator circuit with full generator voltage applied to the circuit. The capacities A, B and C on the drawing indicate the zero sequence capacitances between the circuit conductors 5, 6 and 7, and ground respectively, under normal circuit conditions. The interphase capacitances, not being pertinent to this question are not shown. If a ground fault occurs between one of the generator windings or one of the conductors, such as between conductor 7 and ground at the point D, the capacitance C disappears and the charging current to ground will flow from conductors 5 and 6 through the ground to neutral circuit between points 15 and 16 including the transformer winding 17. In accordance with the invention, the ohmic value of the resistor 21 is so chosen that the kilowatts dissipated in the circuit between the points 16 and 15 is of the order of the capacitive fault kilovolt-amperes flowing through the fault at D.

The following example illustrates the use of a transformer grounding system for a generator of the character described. Assume a 62,500 kva., 13.8-kv. generator connected to a delta winding of a power transformer through 200 feet of cable.

The total capacitance of the three phases of the generator is about 1.05 microfarads. The capacitance of the cables and the transformer is about 0.42 microfarad. The total capacitive reactance will be equal to $$\frac{10^6}{2\pi(60)(1.47)}$$

or 1800 ohms. With full line-to-ground voltage, a total capacitive kva. of $$\frac{(13,800)^2}{3(1800)(1000)}$$

or 35.3 kva. is obtained. Then for this application a 37½ kva. standard distribution type transformer should be used. The transformer must have a primary voltage of 13.8 kv. to get the same insulation level as the generator. The following tabulation gives three set-ups showing voltage, current and resistance on the transformer secondary for a loss in the resistor of 35.3 kw.

| Standard transformer | Max. sec. voltage | Secondary amperes | Secondary resistance ohms |
| --- | --- | --- | --- |
| 13.8 kv./440 v. | 254 | 139 | 1.83 |
| 13.8 kv./230 v. | 133 | 265 | 0.502 |
| 13.8 kv./115 v. | 66 | 535 | 0.123 |

It will thus be seen that I have provided a neutral grounding system for generators which eliminates the prior errors in previous ground fault detecting circuits by proportioning the kilovolt-ampere capacity of the neutral-to-ground transformer with respect to the capacitive fault current and in proportion to the resistance of the neutral-to-ground circuit through the transformer also in terms of capacitive line-to-fault kilovolt amperes.

Modifications of the circuits and apparatus will be apparent to those skilled in the art within the spirit of my invention, and I do not wish to be limited otherwise than by the scope of the appended claims.

I claim as my invention:

1. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings to the transformer low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, the kilovolt-ampere capacity of said neutral grounding transformer being chosen to correspond substantially to the kilovolt-amperes of the charging current to ground from the ungrounded conductors of the generator circuit upon the grounding of one of the conductors of the generator circuit with full line-to-ground voltage on the circuit.

2. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings to the transformer low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, the value of said resistor being chosen to provide a circuit that is proportioned to dissipate energy in the circuit connection between the generator neutral and ground corresponding in kilovolt-amperes to the kilovolt-amperes of the charging current to ground that will flow from the ungrounded conductors of the generator circuit upon the grounding of one of the conductors of the generator circuit with full line-to-ground voltage on the circuit.

3. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings to the transformer low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, said neutral grounding transformer being chosen to have a kilovolt-ampere capacity in the range of from one fifth to five times the kilovolt-amperes of the charging current to ground from the ungrounded conductors of the generator circuit upon the grounding of one of the conductors of the generator circuit, the value of the resistor connected across the secondary of the auxiliary transformer being chosen to provide a circuit that is proportioned to dissipate energy in the circuit connection between the generator neutral and ground having a range in kilowatts of from one fifth to five times the kilovolt-amperes of the charging current to ground from the ungrounded conductors of the generator circuit that will flow upon the grounding of one of the conductors of the generator circuit with full line-to-line voltage on the circuit.

4. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings of the transformer, low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, the kilovolt-ampere capacity of said neutral grounding transformer being chosen within a range of from one fifth to five times the kilovolt amperes of the charging current to ground from the ungrounded conductors of the generator circuit upon the grounding of one of the conductors of the generator circuit with full line-to-line ground voltage on the circuit.

5. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings to the transformer low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, the value of said resistor being chosen to provide a circuit that is proportioned to dissipate energy in the circuit connection between the generator neutral and ground having a range in kilowatts of from one fifth to five times the kilovolt amperes of the charging current to ground that will flow from the ungrounded conductors of the generator circuit upon the grounding of one of the conductors of the generator circuit with full line-to-ground voltage on the circuit.

6. In an electrical system, an electric generator having three phase windings connected together to form a neutral point, an electrical transformer having high-voltage and low-voltage windings for transmitting energy from said generator to a power transmission circuit, a generator circuit including said generator phase windings, the low-voltage windings of the transformer and electrical conductors connecting the generator phase windings to the transformer low-voltage windings, a neutral grounding transformer having a primary and secondary winding, the primary winding being connected between the neutral point of the generator and ground, an electroresponsive protective device connected to the secondary winding, and a resistor connected across the secondary winding of the neutral grounding transformer for dissipating the charging current to ground caused by a fault between a conductor of the generator circuit and ground, said neutral grounding transformer being chosen to have a kilovolt-ampere capacity of the order of the kilovolt-amperes of the charging current to ground from the ungrounded conductors of the generator circuit upon the grounding of one of the conductors of the generator circuit, the value of the resistor connected across the secondary of the auxiliary transformer being chosen to provide a circuit that is proportioned to dissipate energy in the circuit connection between the generator neutral and ground corresponding in kilowatts to the kilovolt-amperes of the charging current to ground from the ungrounded conductors of the generator circuit upon the grounding of one of the conductors of the generator circuit with full line-to-ground voltage on the circuit.

SAMUEL B. GRISCOM.